April 8, 1958     L. E. ELLISON     2,830,265
ELECTRONIC RESISTANCE-CHANGE METER
Filed Aug. 12, 1955

INVENTOR.
LYNN E. ELLISON
BY
Edward H. Lang
ATTORNEY

United States Patent Office 2,830,265
Patented Apr. 8, 1958

2,830,265

ELECTRONIC RESISTANCE-CHANGE METER

Lynn E. Ellison, Crystal Lake, Ill., assignor to The Pure Oil Company, Chicago, Ill., a corporation of Ohio Application August 12, 1955, Serial No. 528,061

6 Claims. (Cl. 324—62)

This invention relates to an electronic device which directly and proportionally indicates changes in resistance, such as those which are produced in resistance bridge measurements.

Because of their accuracy and flexibility in making resistance measurements by means of comparison methods, resistance bridges are incorporated as the sensing element in many instruments. These instruments function as analogue computers to indicate quantitatively changes in physical characteristics which could not be conveniently made by other expedients. One application of such a bridge is in corrosion studies where a corrosion-testing unit, or probe, comprising a pair of serially connected, metallic, foil-like coupons, is exposed to a corrosive environment. Such a device is completely discussed in a co-pending application Serial Number 528,032 entitled "Apparatus for Determining the Influence of Corrosion on Metallic Materials of Construction," filed August 12, 1955, by Glenn A. Marsh and Edward Schaschl. To effect a means for compensating for temperature changes, one of the coupons is insulated from the corrosive environment by means of a suitable protective coating. These coupons comprise one branch of a typical resistance bridge. Suitable electrical connections are made with the other half of the bridge, which is placed outside the corrosive environment along with the power supply to the bridge and an appropriate electrical meter, such as a galvanometer, which functions as a null detector. Upon loss of metal due to corrosion of the unprotected specimen, small increases in resistance are produced. These changes in resistance can be correlated with metal loss by appropriate formulae. These measurements and their proper translation are not conveniently made with facility.

Accordingly, it is the primary object of this invention to provide an electronic apparatus for conveniently detecting and measuring changes in resistance. It is another object of this invention to provide a direct reading instrument for indicating resistance changes. These and other objects will become more apparent from the following detailed description of the instant invention.

In the following detailed description of the instant invention it will be considered in its non-limiting and illustrative application as a corrosion meter. However, with minor changes in the sensing element or bridge circuit, the apparatus may be used as an anemometer, resistance thermometer, or in other applications wherein the changes in resistance of an element in a resistance bridge are translated into a tangible physical dimension.

Figure 1:
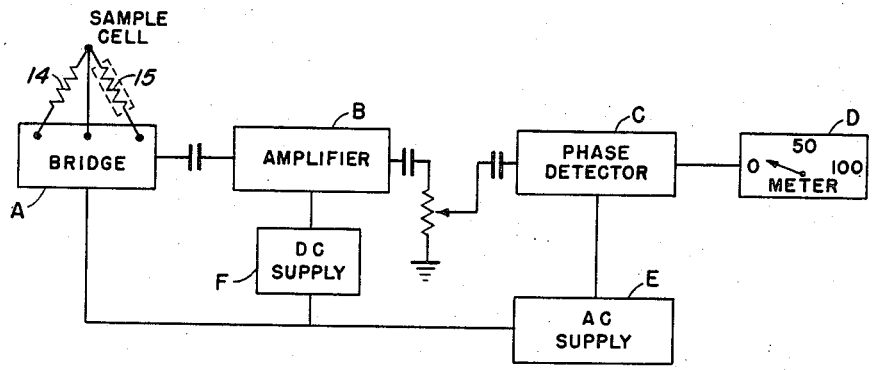
Figure 1 shows in block diagram the functional relationships of the cooperating circuits.

An overall understanding of the invention will be facilitated by reference to Figure 1, which indicates in block diagram the functional parts of this invention. Block A represents any source of small voltage change, such as, for example, a Wheatstone bridge wherein the above-mentioned corrosion-testing unit, or probe, functions as a sensing element and forms one branch of the bridge. Any voltage output or electrical unbalance in the bridge circuit is fed to high-gain amplifier B and amplified to a voltage of sufficient magnitude to operate phase detector C, which in turn operates the meter D that indicates the percentage of corrosion which has taken place. The A. C. supply E furnishes an alternating current voltage for detector C and bridge A. The D. C. supply F furnishes the power necessary for the high-gain amplifier.

Figure 2:
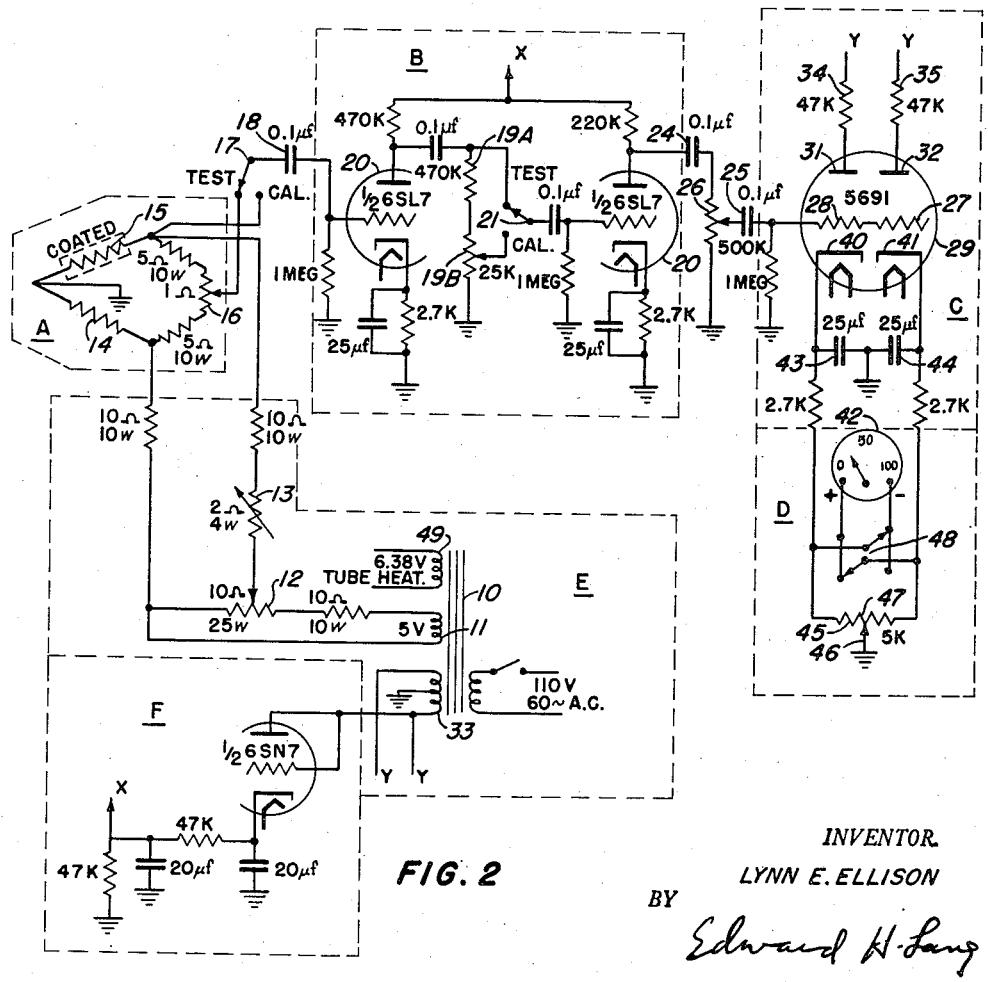
Figure 2 illustrates schematically a specific illustrative embodiment of the instant invention with appropriate notations of the values of the various circuit elements.

Figure 2 shows the component circuits of the instant invention in specific detail. Each of the several cooperating circuits is enclosed by dotted lines, providing an integrated apparatus wherein each component circuit is related as shown in Figure 1. Power for the operation of the apparatus is supplied by means of power transformer 10 which is energized by means of an alternating current supplied to the primary coil of power transformer 10 which is connected to a suitable source of A. C. power, such as 110 volt, 60 cycle A. C. Power transformer 10 is provided with a plurality of secondary taps, including secondary coil 11, which supplies low voltage alternating current across bridge circuit A including the sensing element of the apparatus. Suitable limiting resistances are provided so that a voltage of about 0.05–0.1 volt is applied across the bridge. The amount of voltage supplied to the bridge circuit is controlled by voltage divider 12 in cooperation with variable resistor 13, which permits fine adjustments to be made. In the embodiment shown, the sensing element consists of a corrosion-testing unit, or probe, comprising low resistance elements in the form of foil-like steel strips, 0.001" x 0.125" x 3.0", 14 and 15, which are serially connected and form one branch of the bridge circuit. Resistance 14 is directly exposed to the corrosive environment, whereas resistance 15, although in contact with the corrosive environment, is ensheathed with a protective coating to protect it against corrosive attack as well as provide for compensation due to the effect of change in temperature or resistance. These two elements, mounted in a suitable holder, constitute an integral unit which is installed in a corrosive environment. The other resistance branch of the bridge circuit, which is mounted outside the corrosive environment, consists of voltage divider 16. The bridge circuit is coupled through switch 17 and coupling means 18, which in this instance is a capacitance, to a conventional electrical amplifier circuit B which serves to amplify any low voltage signals in the magnitude of about 1 to 50 millivolts provided by the bridge circuit. The unitary, two-stage amplifier circuit enclosed within the dotted lines consists essentially of a 6SL7 vacuum tube 20, which in this instance is a duo-triode contained in a single envelope but shown as separate units for convenience. Switch 21, which is connected to operate cooperatively with switch 17, is installed to provide a means for changing the voltage characteristics of the amplifier circuit during calibration of the instrument. This is necessary because the magnitude of the calibration voltage across the corrosion-testing unit, or probe, is approximately 20 times the voltage output normally produced in the corrosion studies. Accordingly, switch 21 in cooperation with voltage divider 19B is installed to control the gain necessary for the phase-detecting and metering circuit by including in the circuit current-limiting resistances 19A and 19B. Direct current power for the operation of the amplifier circuit is provided by means of a conventional, vacuum tube rectifier circuit F shown as a complete circuit enclosed by dotted lines. Alternating current is supplied to the rectifier circuit F by secondary tap 33 of transformer 10 and is appropriately rectified to provide a direct current voltage of about 150 to 200 volts. The amplifier circuit B functions in the conventional manner to amplify a signal on the order of 100 microvolts, produced by any unbalancing of the bridge circuit A caused by a change in resistivity of resistance 14 from the sensing element to about 0.5 volt. The signal output from the amplifier circuit is transmitted to the phase-detecting circuit C and metering circuit D by means of coupling condensers 24 and 25, and gain-control 26. The signal from the amplifier circuit is fed to grids 27 and 28 of vacuum tube 29, which functions as a grid-controlled rectifier. These tubes can be separate electron vacuum tubes or a single vacuum tube enclosing the separate set of grid, cathode, and plate within a single envelope. In this instance, the latter expedient is employed and a type 5691 electron tube used. Plates 31 and 32 are connected to secondary coil 33 of power transformer 10 to provide means for energizing the circuit. By applying an alternating current to the plates in this manner, it is seen that a 180° out-of-phase relationship exists between the plates. In this specific embodiment, an A. C. voltage of about 150 to 250 is applied to each plate circuit through current-limiting resistors 34 and 35. The plate circuits are then completed by their respective cathode circuits. Connected in the section of the circuit linking the cathodes is an electrical meter, such as an ammeter, voltmeter, galvanometer, etc., whereby out-of-balance electrical relationships between the cathodes are indicated. In the illustrative example a 0–100 microammeter is used. Also connected across the cathodes are capacitance means 43 and 44 which prevent needle fluctuations in metering device 42 by providing a constant potential in the cathode section of the circuit. Resistance 45 and sliding contact 46, which is grounded, forming a voltage divider 47 are also disposed in the cathode circuit to permit an adjustment whereby both cathodes can have identically the same voltages impressed thereon during the calibration of the instrument. In order that the full deflection characteristics of meter 42 may be used instead of a half-scale deflection, such as when using a galvanometer, reversing switch 48 is also installed in the cathode circuit. This switch is mechanically linked to switches 17 and 21 and functions cooperatively therewith. Switch 48 functions to reverse the polarity of the voltage applied to meter 42 during the calibration of the instrument as will hereinafter be discussed. A secondary tap 49 is also provided in transformer 10 for supplying the necessary voltage to heat the filaments of the various electron vacuum tubes employed in the network. However, to simplify the schematic diagram in Figure 2, this circuit is not completely shown.

The above-described instrument is only illustrative of a preferred combination of circuit elements assembled to form the network shown. However, it is to be understood that other equivalent circuit devices may be employed in preparing modifications of this circuit. For example, the sensing element and bridge circuit can be coupled to the amplifier circuit by means of a transformer coupling, cathode drive, or other conventional coupling means obvious to those skilled in this art. In addition, other circuiting expedients can be substituted for the illustrated amplifier circuit B, e. g., magnetic amplifiers, a substitution of transistors for the vacuum tube elements, and other obvious modifications, so long as a suitable amplification factor is provided. For example, when the apparatus of this invention is used as a corrosion rate meter, an amplification factor of up to about 4900 is required. However, other amplifiers having other amplification factors may be employed, depending upon the application of the instrument. Furthermore, rather than employing condensers 24 and 25 as a means for coupling the amplifier circuit to the phase-detecting and metering circuit, an interstage coupling transformer can be employed. Also, the direct current power source to the amplifier circuit B can also take the form of batteries, crystal rectifiers, or other suitable means of providing direct current to the amplifier circuit. In addition, transistor elements may be substituted for any or all of the electron vacuum tube elements of the various circuits. Substitution of equivalent electrical metering devices will also require changes in the circuitry. For example, if a galvanometer is employed, the instrument can be designed to indicate directly weight loss by employing a calibrated adjustment or manipulating voltage divider 16. This calibration can take the form of a circular slide rule arranged so that adjustment of voltage divider 16 may be automatically divided by the elapsed time, thereby automatically providing an indication of corrosion rate in metal loss per unit time. Also, the voltage across the meter can be utilized to operate the indicating mechanism of a strip-chart recorder. These are only suggested changes, and other alternative modifications of the circuit elements will be obvious to those employing the instant invention.

Prior to employing the apparatus in its design capacity as a detecting and metering instrument for measuring small changes in resistance, at the outset it is necessary to adjust the various circuits to effect a calibration. In order to calibrate the apparatus of this invention there is first installed in the bridge circuit a calibration resistance branch in which the respective resistance arms have the same resistance characteristcs as, for example, resistance elements 14 and 15, of a corrosion-testing unit, or probe. With the calibration resistance branch connected in the bridge circuit, energy is applied to power transformer 10 with switches 17 and 21 in the test position and switch 48 connected to meter 42 as shown in Figure 1. As a result, electrical energy is available to all of the circuits. The first circuit which is adjusted is the phase-detecting and metering circuit. This is done by positioning gain-control 26 in the no-gain position, whereby any signal from the amplifier circuit is dissipated to ground without being transferred to the phase-detecting circuit. With an alternating current being applied to plates 31 and 32 of electron tube 29, tube 29 functions as a full-wave rectifier. Voltage divider 47 is adjusted so that the same amount of potential is applied to cathodes 40 and 41. In this position no current will flow through meter 42 and the meter will read zero. The gain-control 26 is then adjusted to an arbitrary position, preferably about the midway position, and the voltage divider 12 is regulated so as to apply a potential across the bridge circuit. By an appropriate adjustment of voltage divider 16 the ratio of the resistances substituted for elements 14 and 15 by means of the calibration resistance branch is made equal to the resistances of the other resistance branch of the bridge circuit. This balance is indicated by a zero deflection of the meter. In order that the instrument may provide a direct reading in terms of corrosion units by means of meter 42, a 25% increase in resistance is added to the resistance element of the calibration resistance arm substituted for resistance element 14. For calibration purposes it is convenient to substitute a length of noninductively wound copper wire for this resistance element. The length of copper wire is chosen so that the necessary 25% increase in resistance is added in this section of the bridge circuit. For example, a 10 ft. length of #20 copper wire has substantially the same resistance as each of the foil-like steel strips employed in the illustrative embodiment. Accordingly, a 25% incremental resistance is readily provided by using a wire that is 25% longer than 10 ft., namely, 12.5 ft. After this substitution has been made, voltage divider 12 is adjusted in cooperation with gain-control 26 so that the 25% unbalance in the bridge circuit results in a full-scale, or 100 microamperes deflection on meter 42. After this adjustment of gain-control 26, no further adjustment of this circuit element is necessary until the instrument is recalibrated. In order that it can be determined what potential is being impressed across the bridge circuit, switches 17, 21 and 48 are then moved to the calibrate position, in which position the amplifier circuit and phase-detecting and metering circuit function to measure the potential across the resistance element in the calibration resistance arm substituted for resistance element 15. With the switches in the calibrate position, a set of limiting resistances consisting of fixed resistance 19A and voltage-divider 19B are included in the network to compensate for the increase in the magnitude of the calibration voltage across the resistance element of the calibration resistance arm substituted for resistance element 15. The object of this expedient is to limit the amount of power which passes through the metering device, such as ammeter 42. While the illustrated arrangement of resistances is preferred, the same effect can be provided by installing in the metering circuit a suitable shunt device which will temporarily carry the increase in load applied to the phase-detecting and metering circuit during this phase of the calibration period. Other expedients to effectuate this purpose will also be obvious to those skilled in this art. Without further adjustment of voltage divider 12, voltage divider 19B is positioned to provide an arbitrary reading of 50 on meter 42 and then allowed to remain in this position. This phase of the calibration procedure is necessary in order that there may readily be determined the magnitude of the potential applied across the bridge circuit during the use of the instrument as a metering and detecting device. The potential applied to the bridge circuit to give a selected deflection such as, in this instance, 50, is independent of the initial resistance of the resistance element of the calibration resistance arm substituted for resistance element 14. This can be shown by a mathematical analysis of the Wheatstone bridge. However, the theory was tested by substituting non-inductively wound copper wire of various gauges which had resistances of about one-half or double that used in the initial calibration. In each case upon adjusting voltage divider 12 to provide an applied potential of the proper value, i. e., 50 in this instance, an incremental change of 25% in the resistance of one of the resistance elements resulted in exactly a deflection of 100 microamperes. After these adjustments have been made, the instrument is calibrated and switches 17, 21 and 48 are returned to the test position. Upon substituting a standard corrosion-testing unit, or probe, such as that previously described, the instrument is then ready for use as a test apparatus. Using this technique, a large number of corrosion-testing units, or other similar resistance units in which small changes in resistance is effected, can be tested with the same apparatus. Each corrosion-testing unit or other bridge circuit-containing device is appropriately identified and the setting of voltage divider 16 corresponding to the initial balance with each corrosion-testing unit or resistance-containing element is correlated with a suitable identification of the probe. Therefore, when new corrosion-testing units, or probes, are installed in the bridge circuit or readings are made on corrosion-testing units previously installed in corrosive environments which are being investigated, it is only necessary to readjust voltage divider 16 to the appropriate balance setting for that particular corrosion-testing unit and ascertain whether or not the predetermined constant potential is being applied across the bridge circuit.

As stated previously, the apparatus network is so adjusted that a 25% increase in resistance of the corroding specimen is indicated as a 100 microamperes deflection. As there is a reciprocal relationship between resistance and cross-sectional area this 100 microamperes deflection indicates a 20% decrease in average cross-sectional area, or a 10% change in average thickness on each side of the specimen. The specimens have a high ratio of width to thickness. Because the edges of the specimen are small, they are neglected in the calculation. When employing a 0.001" thick specimen the 100 microamperes deflection corresponds to a corrosion loss of 0.001" or 100 microinches. The meter reading therefore directly corresponds to the loss in metal thickness of one side of the corroding specimen in microinches for a 0.001" thick specimen. For thinner specimens the $$\text{meter reading} \times \frac{\text{original thickness of specimen}}{0.001''} = \text{metal loss in inches}$$

The stability of the apparatus of this invention is excellent, and being designed on bridge principles it is reasonably unsusceptible to the effect of normal line-voltage fluctuations. No precautions are needed against picking up stray currents. However, it is necessary to make all connections between the bridge circuit and the corrosion-testing units with low-resistance leads.

While the subject invention has been described in its application as a corrosion meter, other uses such as those noted above will be obvious to those skilled in this art. Similarly, modifications in the illustrated circuitry may also be made without departing from the purview of this invention. It is also evident that obvious circuitry changes will affect the manipulative operations involved in using the modified device. Accordingly, the subject apparatus is limited only by the apparatus network defined in the appended claims.

Accordingly, I claim as my invention:

1. An electrical network for detecting and measuring variations in electrical resistance which comprises an electrical bridge circuit containing a first source of alternating current power, and a first resistance branch and a second resistance branch electrically connected in parallel with said first power source, one of said branches including a low-resistance means susceptible to variations in resistance due to the effect of the environment to which said resistance means is exposed, and the other of said branches containing a means for balancing the bridge circuit; an electrical amplifier circuit, a first coupling means for electrically coupling said amplifier circuit to said bridge circuit whereby any electrical unbalance in said bridge produced by a change in resistance of said low-resistance means will effect a signal input which is fed into said amplifier circuit, said amplifier circuit producing a signal output through the suitable amplification of said signal input; a phase-detecting and metering circuit, a second coupling means for electrically coupling said phase-detecting and metering circuit to said amplifier circuit; a first voltage-divider through which the signal output from said amplifier circuit passes to said phase-detecting and metering circuit whereby the gain of said signal output can be controlled, said phase-detecting and metering circuit comprising a pair of grid-controlled rectifiers, each of said rectifiers containing plate, grid, and cathode elements, the grids of said rectifiers being connected to said first voltage-divider to receive the signal output from said amplifier circuit, a source of alternating current power applied to the plates of said rectifiers to produce an out-of-phase relationship between said plates of about 180°, an electrical metering device connected in said phase detecting and metering network whereby any out-of-balance electrical relationship between said grid-controlled rectifiers may be made visibly manifest, and a second voltage-divider means disposed between said cathodes whereby a voltage balance between said cathodes can be maintained, a means for calibrating said network wherein amounts of power in excess of that employed in detecting and measuring variations in electrical resistance are passed through said circuits, comprising a first electrical switch means interposed in said network between said first coupling means and said bridge circuit whereby the power from said first power source may be introduced directly into said amplifier circuit solely through the resistance branch of said bridge circuit containing said low-resistance means, a means for adjusting the amount of power provided by said first alternating current power source and a high resistance means cooperating with said first switch means whereby the amount of power passing through said metering device during the calibration of said network is controlled.

2. An electrical network for detecting and measuring variations in electrical resistance which comprises an electrical bridge circuit containing a first source of alternating current power, and a first resistance branch and a second resistance branch, electrically connected in parallel with said first power source, one of said branches including a low-resistance means susceptible to variations in resistance due to the effect of the environment to which said resistance means is exposed, and the other of said branches containing a means for balancing the bridge circuit; an electrical amplifier circuit, a first coupling means for electrically coupling said amplifier circuit to said bridge circuit whereby any electrical unbalance in said bridge produced by a change in resistance of said low-resistance means will effect a signal input which is fed into said amplifier circuit, said amplifier circuit producing a signal output through the suitable amplification of said signal input; a phase-detecting and metering circuit, a second coupling means for electrically coupling said phase-detecting and metering circuit to said amplifier circuit, a first voltage-divider through which the signal output from said amplifier circuit passes to said phase-detecting and metering circuit whereby the gain of said signal output can be controlled, said phase-detecting and metering circuit comprising a pair of grid-controlled rectifiers, each of said rectifiers containing plate, grid, and cathode elements, the grids of said rectifiers being connected to said first voltage-divider to receive the signal output from said amplifier circuit, a source of alternating current power applied to the plates of said rectifiers to produce an out-of-phase relationship between said plates of about 180°, an electrical metering device connected across the cathodes of said rectifiers whereby any out-of-balance electrical relationship between said cathodes may be made visibly manifest, and a second voltage-divider means disposed between said cathodes whereby a voltage balance between said cathodes can be maintained; a means for calibrating said network wherein amounts of power in excess of that employed in detecting and measuring variations in electrical resistance are passed through said circuits, comprising a first electrical switch means interposed in said network between said first coupling means and said bridge circuit whereby the power from said first power source may be introduced directly into said amplifier circuit solely through the resistance branch of said bridge circuit containing said low-resistance means, a means for adjusting the amount of power provided by said first alternating current power source and a high-resistance means cooperating with said first switch means whereby the amount of power passing through said metering device during the calibration of said network is controlled.

3. A network in accordance with claim 2 in which a second switch means cooperating with said metering device is provided to control the polarity of the power passing through said metering device during the calibration thereof.

4. A network in accordance with claim 3 in which in said phase-detecting and metering circuit a pair of serially-connected capacitance means are connected across said cathodes in parallel with said second voltage-divider whereby power fluctuations in said metering device are prevented.

5. An electrical network for detecting and measuring variations in electrical resistance which comprises an electrical bridge circuit containing a first source of alternating current power, and a first resistance branch and a second resistance branch electrically connected in parallel with said first power source, one of said branches including a low-resistance means susceptible to variations in resistance due to the effect of the environment to which said low-resistance means is exposed, and the other of said branches containing a means for electrically balancing the bridge circuit; a two-stage electron tube amplifier circuit a source of direct current for supplying power to said amplifier circuit, a first coupling means for electrically coupling said amplifier circuit to said bridge circuit whereby any electrical unbalance in said bridge circuit produced by a change in resistance of said resistance means will effect a signal input which is fed into said amplifier circuit, said amplifier circuit producing a signal output through the suitable amplification of said signal input; a phase-detecting and metering circuit, a second coupling means for electrically coupling said phase-detecting and metering circuit to said amplifier circuit, and a first voltage-divider means through which the signal output from said amplifier passes to said phase-detecting and metering circuit whereby the gain of said signal output can be controlled, said phase-detecting and metering circuit comprising a pair of electron tube grid-controlled rectifiers, each of said rectifiers containing plate, grid and cathode elements, the grids of said rectifiers being connected to said voltage-divider to receive the signal output from said amplifier circuit, a second source of alternating current power applied to the plates of said rectifiers to produce an out-of-phase electrical relationship between said plates of about 180°, an electrical metering device comprising a microammeter connected across the cathodes of said rectifiers whereby any out-of-balance electrical relationship between said cathodes may be made visibly manifest, a pair of serially-connected capacitance means connected across said cathodes in parallel with said microammeter whereby fluctuations in the current passing through said microammeter are prevented, and a second voltage-divider means disposed between said cathodes whereby a voltage balance between said cathodes can be maintained; a means for calibrating said network wherein amounts of power in excess of that employed in detecting and measuring variations in electrical resistance are passed through said circuits, comprising a first switch means interposed in said network between said first coupling means and said bridge circuit whereby the power from said first power source may be introduced directly into said amplifier circuit solely through the resistance branch of the bridge circuit containing said low-resistance means, a second switch means cooperating with said metering device to control the polarity of the power passing through said metering device during the calibration thereof, and a third electrical switch means mechanically cooperating with said first and second switch means electrically connected in said amplifier circuit between the first and second stages thereof whereby the increase in power employed during the calibration of the network can be controlled.

6. A network in accordance with claim 5 in which capacitances are employed as said coupling means.

References Cited in the file of this patent
UNITED STATES PATENTS

| Number | Name | Date |
|---|---|---|
| 2,189,092 | Urmenyi | Feb. 6, 1940 |
| 2,434,822 | Van Beuren et al. | Jan. 20, 1948 |
| 2,623,206 | Hornfeck | Dec. 23, 1952 |
| 2,656,509 | Vore et al. | Oct. 20, 1953 |
| 2,658,819 | Formwalt | Nov. 10, 1953 |
| 2,666,164 | Albrecht | Jan. 12, 1954 |